United States Patent [19]

Ishman

[11] 3,763,491
[45] Oct. 2, 1973

[54] METHOD AND CIRCUITRY FOR ELIMINATING UNDESIRED MODULATION OF VOR SIGNALS

[75] Inventor: Neal H. Ishman, Springfield, Va.

[73] Assignee: American Standard Inc., Falls Church, Va.

[22] Filed: July 1, 1970

[21] Appl. No.: 51,540

[52] U.S. Cl. .............................. 343/106 R, 325/408
[51] Int. Cl. ............................................. G01s 1/46
[58] Field of Search ................. 343/106 R; 325/408, 325/400

[56] References Cited
UNITED STATES PATENTS
3,495,247   2/1970   Perkins ........................... 343/106 R

*Primary Examiner*—Samuel Feinberg
*Assistant Examiner*—Richard E. Berger
*Attorney*—Hurvitz & Rose

[57] ABSTRACT

Error-inducting AM components of a VOR signal, such as those produced by multi-path reflections and particularly by helicopter rotor reflections, are suppressed at the VOR receiver by employing a fast AGC loop for the receiver If amplifier. The AGC amplifier is derived by employing an auxiliary filter to pass the 9.96 KHz VOR subcarrier and detecting all AM appearing on the subcarrier. Since the subcarrier should only be frequency-modulated by a reference signal, and AM components appearing on the subcarrier are undesirable. The pass band of the auxiliary filter is wider than that of the 9.96 KHz filter employed in the bearing indication circuit. The detected AM is passed through a low pass filter having a cut-off above the frequency of the undesired AM components, and the low pass filter output signal is employed as the primary AGC signal to control the gain of the receiver IF amplifier in phase opposition to the AM envelope appearing at the amplifier input. In addition, the IF output signal is applied to am amplitude threshold detector which responds to extremely high IF signal amplitudes to override the primary AGC signal and apply a supplemental AGC signal to effect rapid IF amplifier gain reduction.

15 Claims, 6 Drawing Figures

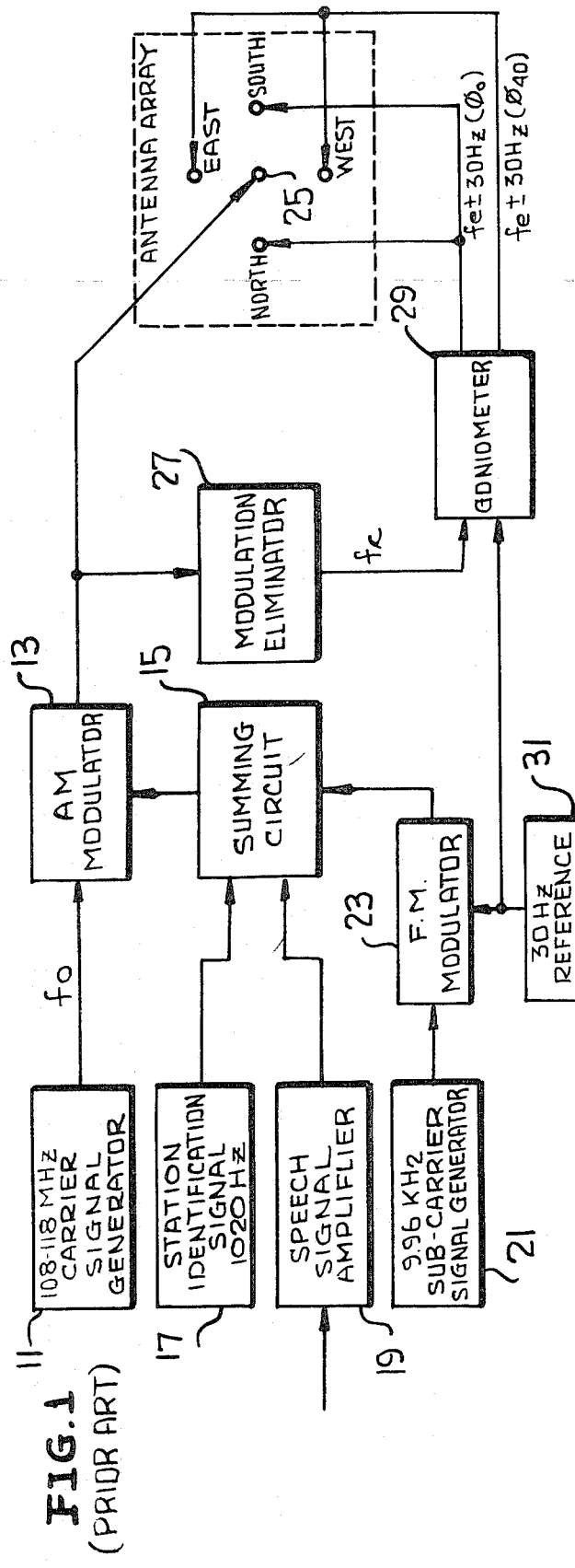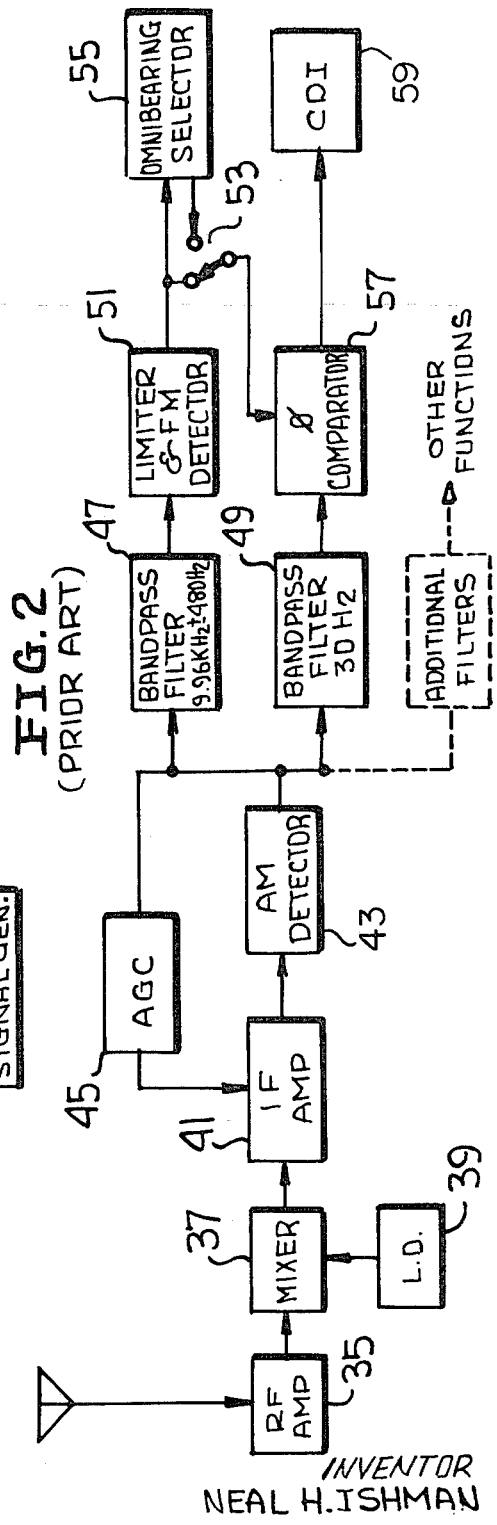

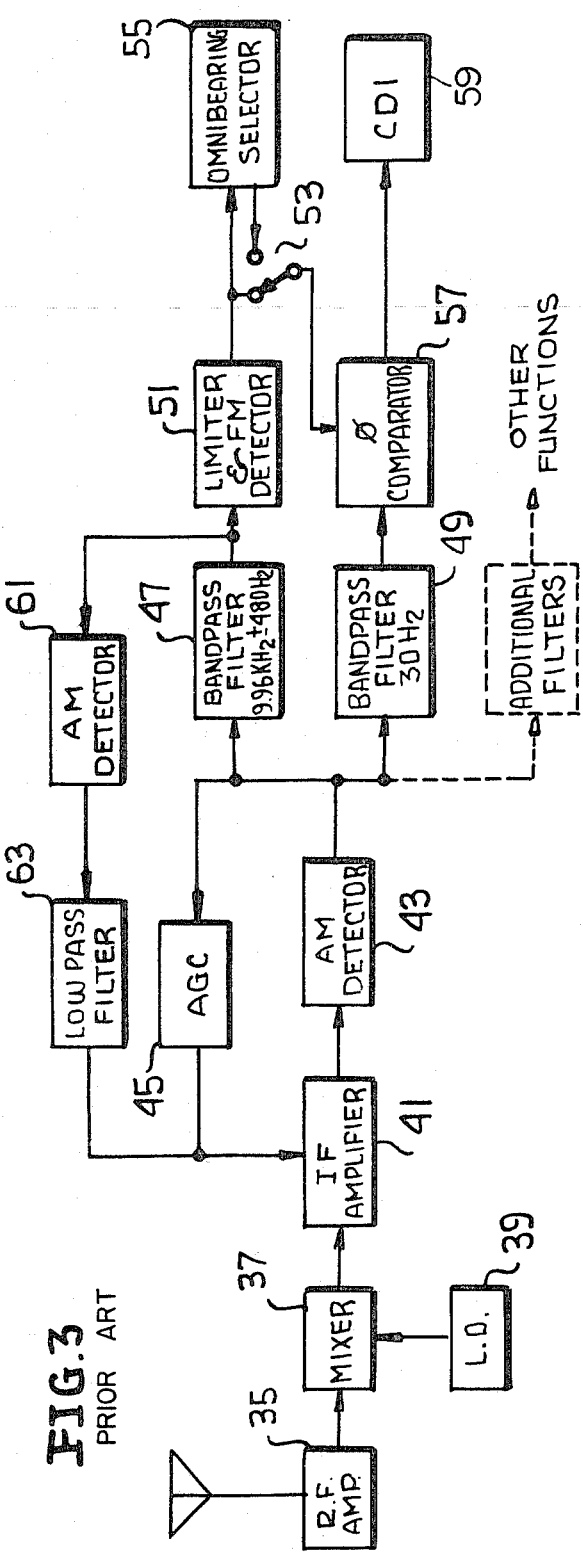
FIG.3 PRIOR ART
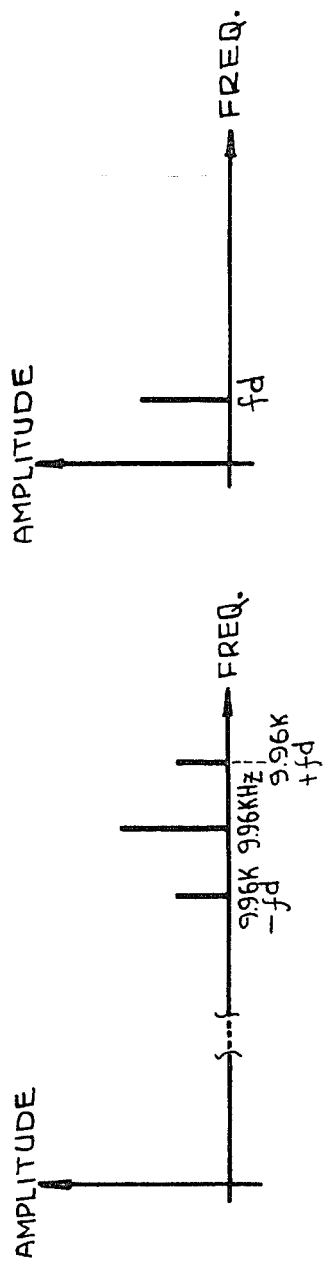
FIG.4
FIG.5
INVENTOR
NEAL H. ISHMAN
By Hurvitz & Rose
ATTORNEYS

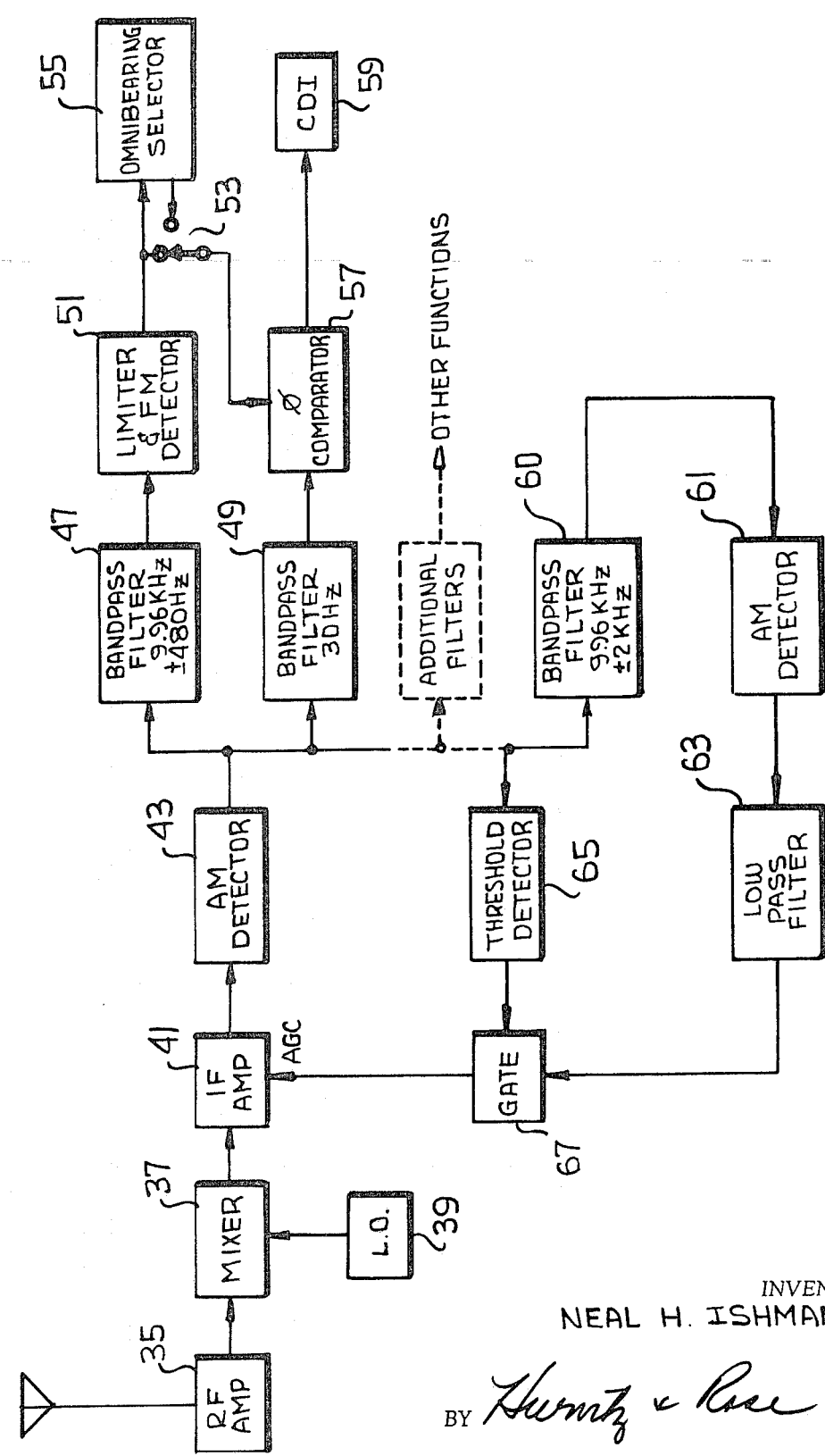

METHOD AND CIRCUITRY FOR ELIMINATING UNDESIRED MODULATION OF VOR SIGNALS

BACKGROUND OF THE INVENTION

The VOR (VHF Omni-directional Range) navigation system is the standard short azimuthal navigation aid used for commercial aircraft in the United States. In this system an omni-directional radio range beacon, transmitted from a station, permits a suitably equipped aircraft to determine its bearing relative to that station. A carrier signal in the frequency range of 108 to 118 MHz provides bearing information by rotating in space a cardioid-shaped variable-phase antenna pattern at the rate of 30 revolutions per second. This cardioid pattern is generated either by fixed antennas fed by a goniometer or by an antenna system containing a rotating element. To enable the aircraft to determine its bearing, a reference 30 Hz signal is transmitted omni-directionally as a frequency-modulated component of a subcarrier of 9.96 KHz, the latter being an AM component of the VOR signal. The detected output signal at the omni-range receiver comprises two 30 Hz components having a phase difference which depends upon the bearing of the aircraft with respect to the station. The two components are in phase when the receiving antenna is due north of the station and the phase of the variable signal lags the reference signal by the number of degrees the aircraft receiver antenna is moved clockwise about the station from the north direction. Phase displacement of the two signals is measured in the aircraft and may be displayed on various types of instrumentation known in the art.

As received at the aircraft these VOR signals are subject to undesired amplitude-modulation wherever a situation exists in which the signal experiences multi-path reflections which vary with time. Reflections of this type may result from aircraft or reflector movement. The amplitude-modulation induced by these reflections is generally in the frequency range of the 30 Hz signals and introduces phase variations in the 30 Hz signals being monitored, thereby causing errors in course measurement. These errors are manifested by movement of the vertical needle at the course deviation indicator (CDI).

The problem of undesired modulation of VOR signals has become increasingly acute in rotary-wing aircraft, such as helicopters, at which rotor reflection induces high level AM on the VOR signal. The chopping frequencies and their dominant harmonics in such aircraft are in the range of the 30 Hz signals utilized to determine the bearing of the craft, and measurements have indicated that severe AM of the carrier occurs when the chopping rate of the rotor is exactly 10 Hz or one-third of the 30 Hz signal.

Prior art attempts to minimize this undersired modulation of VOR signals have generally taken the form of insertion of low pass filters in the signal line feeding the CDI. However, to be effective against noise, such filtering must have time constants of such duration as to be unacceptable in situations where a craft is being steered in dependence upon the filtered signal. For example, time constants on the order of 20 seconds are common in such filters, and the resulting time lag introduced by the filter in these circumstances may cause the pilot to overshoot a selected course.

Certain other prior art approaches to minimizing the undesired modulation problem have required the addition of complex and expensive equipment which consumes valuable space aboard the aircraft.

One prior art approach to minimization of rotor modulation is described in a final report prepared for the U.S. Army Signal Corps Supply Agency under Contract No. DA 36-039 SC-52668 by R. B. Battelle and entitled "Study of Helicopter Rotor Modulation of the V-H-F Omnirange Signal", particularly at Chapter 5, pages 71, 72. The approach recognizes that the 9.96 KHz subcarrier is normally radiated from the ground station at constant amplitude and therefore any variations in its amplitude would be a measure of rotor or other undesired modulation. The report then suggests detection of amplitude-modulation appearing on this subcarrier for purposes of providing an auxiliary AGC signal in shunt with the normal AGC signal for the VOR receiver. Such an approach was found to provide a 6 db improvement in rotor modulation reduction as compared with other prior art approaches. However, this approach has not been widely adopted because it introduces its own problems which tend to mitigate against the advantages of rotor modulation reduction. Specifically, the pass band of the frequency selective circuits in this AGC channel must have extremely flat frequency responses in order to prevent spurious amplitude-modulation of the subcarrier by the auxiliary AGC circuit itself. The requirements for amplitude-modulation elimination from the 30 Hz reference phase modulator at the ground transmitter would be likewise stringent. Further, the 9.96 KHz filter employed for bearing indication usually has a ±480 Hz pass band, and it was found that phase shifts introduced by this filter near the extremities of its pass band tended to render the auxiliary AGC loop unstable. This limited the permissible loop gain and, in turn, the degree of rotor modulation reduction which could be achieved. It is a particular object of the present invention to improve this approach to reduction of rotor and other undesired VOR signal modulation whereby the aforesaid problems are avoided and undesired modulation is reduced to a much greater degree.

It is an object of the present invention to significantly minimize the effects of undesired modulation on VOR signals with the use of simple, compact circuitry with which existing VOR receivers can be readily modified.

It is another object of the present invention to minimize the effects of undersired low frequency amplitude-modulation of VOR signals without delaying the response time of the VOR system.

It is a particular object of the present invention to minimize the effects of rotor modulation on VOR signals received at rotary-wing aircraft.

It is another object of the present invention to minimize undesired amplitude-modulation of VOR signals by deriving the principal AGC signal from amplitude-modulation components appearing on the 9.96 KHz VOR subcarrier.

SUMMARY OF THE INVENTION

In accordance with the present invention a 9.96 KHz auxiliary filter having a ±2KHz pass band applies the subcarrier to an AM detector and in turn to a low pass filter having a cut-off frequency above that of the undesired AM. The output signal from the low pass filter is then employed as the principal AGC signal in the IF section of the receiver, and is applied 180 degrees out of phase with the AM envelope appearing on the IF input signal. This AGC signal is composed of undesired AM appearing on the 9.96 KHz subcarrier which, ideally, should only have FM appearing thereon. A supplemental AGC signal is provided via a threshold detector only when the IF output signal exceeds a predetermined level. Whereas the prior art approach employing amplitude-modulation of the subcarrier as an auxiliary AGC signal provides only 6 db reduction in undesired modulation, the approach of the present invention provides a 20 db reduction of undesired modulation.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein:

FIG. 1 is a block diagram of a typical VHF Omnirange Transmitter;

FIG. 2 is a block diagram of a typical prior art VOR receiver;

FIG. 3 is a block diagram of a VOR receiver modified in accordance with prior art principles for the purpose of reducing rotor modulation;

FIG. 4 and 5 are plots of the frequency spectrum of two signals appearing in the receiver of FIG. 3;

FIG. 6 is a block diagram of the VOR receiver of FIG. 3, modified in accordance with the principles of the present invention to avoid prior art problems.

DESCRIPTION OF THE PREFERRED EMBODIMENT

Referring now more particularly to FIG. 1 of the accompanying drawings, there is illustrated a block diagram of a typical VOR transmitter, known in the prior art, and located at a VOR station. A source of carrier signal at frequency $f_c$ (108–118 MHz) applies a signal to AM modulator 13. The latter also receives, from a summing circuit 15, a plurality of modulation signals with which the carrier is to be amplitude-modulated. These modulation signals include: a station identification signal at approximately 1,020 Hz from signal source 17; a voice modulation signal from a standard microphone input via a speech signal amplifier 19; a subcarrier 9.96 KHz signal from a source 21 thereof, which subcarrier is frequency modulated ±480 Hz at FM modulator 23 at a 30 Hz rate by a reference signal from 30 Hz source 31. The composite amplitude-modulated signal, derived from AM modulator 13, is applied to the omni-directional feed 25 of a VHF Omni-range Antenna array to provide one component of the propagated navigational signal.

The composite signal provided by AM modulator 13 is also applied to a modulation eliminator 27 which delivers the carrier signal at frequency $f_c$, free of all modulation, to a goniometer 29. Modulation eliminator 27 may, for example, comprise a highly saturated vacuum tube amplifier stage having AGC feed back. Under the effect of automatic gain control, in conjunction with operation of the amplifier in the saturated mode, the gain of the amplifier becomes an inverse function of envelope amplitude, resulting in the required carrier frequency signal at its output terminal. Goniometer 29, which by way of example only, may be of the type disclosed in U. S. Pat. No. 3,328,798, which patent is incorporated herein by reference, also receives the 30 Hz reference signal from source 31. The goniometer acts as a balanced modulator to suppress the carrier, $f_c$, and provides two sideband components at $f_c \pm 30$ Hz. This signal at zero phase is fed to the north-south feeds of the Omni-directional Antenna array; the same signal at 90° phase angle feeds the east-west feeds of the antenna array. This arrangement, as is well-known in the art, effectively provides an entire field which is rotated once for each cycle of goniometer 29, the field rotation producing, in effect, a space modulation of the amplitude of the radiated signal. This modulation appears as amplitude-modulation on the radiated VOR signal received by a VOR receiver. The phase of this AM component, when referenced to the phase of the 30 Hz reference signal appearing as an FM component on the 9.96 KHz subcarrier, provides a measure of the azimuth or bearing of the receiving aircraft relative to the transmitting station. More particularly, the phase of the received variable-phase AM component of the VOR signal varies in direct proportion, degree for degree, with changes in azimuth of the receiving aircraft relative of north bearing.

A typical prior art VOR receiver is illustrated in FIG. 2 and illustrates how the phase difference between the 30 Hz standard, appearing as an FM component on the 9.96 KHz subcarrier, and the variable-phase 30 Hz signal provide a measure of azimuth relative to the transmitting station. The received VOR signal is applied to an RF amplifier 35 and in turn to a mixer 37 where it is converted to IF by means of local oscillator 39. The resulting IF signal, which has appearing thereon all of the AM components present on the received VOR signal, is applied to IF amplifier 41 and in turn to AM detector 43 which acts in a conventional manner to detect the various AM components described in relation to FIG. 1. Conventional AGC circuitry 45 is connected to receive the output signal from AM detector 43 to control the output signal level of IF amplifier 41.

In addition, the output signal from AM detector 43 is applied to a plurality of filters including band pass filter 47 and band pass filter 49. Band pass filter 47 has a center frequency at 9.96 KHz and has a 960 Hz bandwidth (at the 3 db points). The output signal from filter 47 is thus the 9.96 KHz subcarrier, frequency-modulated at a 30 Hz rate by the reference signal. This frequency-modulated signal is applied to a limiter and FM detector circuit 51 which provides an output signal comprising the 30 Hz reference signal. The 30 Hz reference signal is then applied to a contact on switch 53 as well as to an omni-bearing selector circuit 55. An output signal from omni-bearing selector circuit 55 is applied to another contact on switch 53, the movable arm of which is connected to a phase comparator 57. Phase comparator 57 also receives an input signal from band pass filter 49, the latter having a center frequency of 30 Hz. The output signal from phase comparator 57 is a DC signal, representing the difference in phase between the two applied input signals, and is applied to a course deviation indicator (CDI) 59. The 30 Hz signal passing through band pass filter 49 represents the AM component introduced on the carrier by the goniometer at the antenna array in FIG. 1. The phase of this signal is a function of the position of the aircraft containing the circuitry of FIG. 2 relative to the transmitting station containing the circuitry of FIG. 1.

With switch 53 in the position shown in FIG. 2 the reference signal applied to phase comparator 57 is received directly from the limiter and FM detector 51. In this mode of operation the phase difference between the two signals applied to phase comparator 57, and hence the level of the DC output signal from phase comparator 57, is a function of the deviation of the aircraft bearing from true north of the transmitting station. With switch 53 in position to receive a reference signal from the omni-bearing selector circuit 55, the phase difference between the two signals applied to phase comparator 57, and hence the signal level of the DC signal provided by phase comparator 57, is a function of the deviation of the aircraft bearing from some arbitrary bearing selected by means of selector circuitry 55. Circuitry typical of that employed in omni-bearing selector circuit 55 may be found in U.S. Pat. No. 3,414,901.

All of the VOR system circuitry described hereinabove in relation to FIGS. 1 and 2 is conventional and well-known in the art. The VOR system as described is susceptible to course measurement errors introduced by unwanted amplitude-modulation of the carrier frequency $f_c$. As described above, such unwanted modulation may result from any multi-path reflection and is particularly severe when the VOR receiver is located aboard a helicopter or similar rotary-wing aircraft. The rotor modulations effectively amplitude-modulate the carrier as well as the various AM components appearing on the carrier. Thus, referring to FIG. 2, the output signal from band pass filter 47, which should have no AM components appearing thereon, does in fact contain unwanted AM components produced by rotor modulation of the carrier signal. Likewise the output signals from band pass filter 49 and the additional filters provided for other functions in the system contain the undesired rotor modulation components. The frequencies of these unwanted AM components are usually at or below the 30 Hz reference signal and are passed on to the CDI to provide the course deviation phenomenon in accordance with the unwanted AM components.

Referring now to FIG. 3 of the accompanying drawings there is illustrated the VOR receiver of FIG. 2 modified in accordance with prior art principles to minimize the effects of the aforementioned unwanted AM components appearing on the received VOR signal. The system components described in relation to FIG. 2 appear in FIG. 3 once again, and are designated by the same reference numerals employed in FIG. 2. The modification employed in the receiver of FIG. 3 comprises additional AGC circuitry for IF amplifier 41. The AGC signal for this circuit is derived from the output signal of band pass filter 47 and is applied to an AM detector 61. The output signal from detector 61 is fed to a low pass filter 63 which introduces a 180° phase shift and passes its output signal as an AGC signal to IF amplifier 41 in conjunction with the AGC signal applied by AGC circuit 45. The input signal to AM detector 61 is the frequency-modulated 9.96 KHz AM component of the VOR signal. This subcarrier should, ideally, only be frequency-modulated and is only amplitude-modulated by unwanted AM components appearing on the VOR signal. These unwanted AM components are separated from the frequency-modulated 9.96 KHz signal by detector 61 and then inverted in phase and passed by low pass filter 63 to IF amplifier 41, thus only the undesired AM signal is applied as the AGC signal to IF amplifier 41. Importantly, the unwanted AM components are applied as AGC signal to IF amplifier 41 180° out of phase with the AM envelope on the IF signal applied to amplifier 41. The gain of amplifier 41 is thus varied in phase opposition to the unwanted AM envelope appearing on the amplifier signal and the unwanted AM is thereby suppressed.

Referring to FIG. 4 there is illustrated the frequency spectrum of the input signal to AM detector 61. This signal contains three primary components, namely: the 9.96 KHz subcarrier (which of course is being frequency-modulated at a 30 Hz rate over a 960 Hz range about the 9.96 KHz center frequency); a 9.96 KHz $-f_d$ component, where $f_d$ is the frequency of the unwanted amplitude-modulation appearing on the VOR signal (it being understood that this signal too is varying in frequency at a 30 Hz rate); and a 9.96 KHz $+f_d$ component (also being varied at a 30 Hz rate). Low pass filter 63 is arranged to have a cut-off frequency above $f_d$ but well below 9.96 KHz $-f_d$, and falls off at a 12 db per octave rate. The resulting signal provided by filter 63 has a spectrum such as that illustrated in FIG. 5, consisting solely of the unwanted $f_d$ component. This $f_d$ component is then combined with the AGC signal provided by AGC circuit 45, in phase opposition with the undesired modulation envelope appearing on the input signal to amplifier 41, to suppress the unwanted modulation.

The important aspect of the modified receiver circuit illustrated in FIG. 3 is that the AGC signal is derived from a subcarrier of the VOR signal which should be frequency-modulated only, or, at least, has no intentional amplitude-modulation components within the pass band of filter 63. By definition then, any amplitude-modulation of this subcarrier below the cut-off of filter 63 is unwanted and acts to suppress itself via the AGC loop. The modification of FIG. 3 thus essentially comprises a closed AGC loop, and the amount of suppression of unwanted modulation is determined by the loop gain and filter bandwidths. The bandwidth of low pass filter 63 is of course determined by the frequency range of unwanted modulation to be suppressed. The loop gain is theoretically adjusted in accordance with conventional circuit loop theory to provide the best balance between modulation suppression and loop stabilization. As described above, however, it has been found that only about 6 db of modulation suppression improvement is obtainable with the AGC loop of FIG. 3 before loop instability becomes a significant factor. To overcome this limitation and the other problems described above, the circuit of FIG. 3 has been modified according to the principles of the present invention in the manner described below.

Referring specifically to FIG. 6, there is illustrated a block diagram of the VOR receiver of FIG. 3, modified according to the principles of the present invention in order to further reduce unwanted amplitude-modulation and eliminate the problems associated with the FIG. 3 approach. The components of FIGS. 2 and 3 which appear in FIG. 6 are designated by the same reference numerals. The modification in FIG. 6 is twofold: (1) an auxiliary filter 60 has been added to provide the 9.96 KHz signal for the principle AGC loop, leaving filter 47 to serve solely in its bearing indication capacity; and (2) AGC circuit 45 has been deleted in favor of a threshold detector 65 which provides a supplemental AGC signal only when the IF output signal exceeds a predetermined level. The remainder of the circuit of FIG. 6 is identical to that of FIG. 3. The reasons for the changes implemented in FIG. 6 are set forth below.

Filter 47, which must have a relatively narrow ±480 Hz pass band for purposes of bearing indication, tended to render the supplemental AGC loop of FIG. 3 unstable. Filter 60, on the other hand, is also centered at 9.96 KHz but has a ±2 KHz pass band. This new AGC loop, including filter 60, detector 61 and filter 63, being considerably more stable, is now able to serve the primary or principal AGC function for the receiver permitting elimination of AGC circuit 45 of FIG. 3. For most purposes, the new principal AGC loop is sufficient; however, problems arise where the pilot switches the VOR receiver to receive a ground station when the aircraft is located very close to that station. The sudden reception of a high level signal tends to saturate the IF amplifier, resulting in clipping of the IF output signal. Such clipping eliminates the 9.96 KHz subcarrier which is amplitude-modulated on the carrier, and without the subcarrier the principal AGC loop cannot function. To correct this situation, the IF output signal is applied to threshold detector 65 which provides an output signal only when the IF output signal exceeds some predetermined level. The output signal from threshold detector 65 is applied to gate 67 along with the principal AGC signal from low pass filter 63. Normally, when there is no output signal from threshold detector 65, the principal AGC signal is passed unaffected by gate 67 to IF amplifier 41. When threshold detector 65 provides an output signal, the latter dominates the principal AGC signal and provides a large amplitude AGC signal to quickly reduce the gain of amplifier 41. Once the gain is thus reduced, the IF output signal no longer exceeds the threshold of detector 65 and the principal AGC signal resumes effectiveness.

As an example, a gate which may serve the function described above for gate 67 could take the form of a pair of diodes having their cathodes connected in common and their anodes connected to receive output signals from detector 65 and filter 63 respectively. The diode for filter 63 would be provided with bias circuitry so as to be normally conductive to the principal AGC signal. The relatively high level signal from threshold detector 65, when present, would pass through its diode and back-bias the other diode.

The pass band of filter 60 must be large enough to provide sufficient stability margin for the AGC loop; the pass band must also not be so large as to pass the speech signals which appear as AM on the VOR signal. The speech components may be as high as 4.5 KHz so that the lower end of the pass band of auxiliary filter 60 must be significantly higher than the frequency. In the system of FIG. 6, the 4 KHz pass band places the lower 3 db point of filter 60 at 7.96 KHz. Using such a filter in a test, a 20 db suppression of unwanted AM was obtainable by choosing components to optimize loop gain and stability considerations.

The use of an AGC loop of the type described in relation to FIG. 6 permits accurate measurement of bearing or azimuth in a VOR system to the exclusion of course deviations caused by undersired modulation and without requiring undue delay of course bearing indication. The simplicity of the modification provided by the present invention makes it ideally suitable for use in aircraft by a simple modification in existing VOR receiver circuitry.

While I have described and illustrated one specific embodiment of my invention, it will be clear that variations of the details of construction which are specifically illustrated and described may be resorted to without departing from the true spirit and scope of the invention as defined in the appended claims.

I claim:

1. In a receiver wherein a received signal comprises a carrier signal which is intentionally amplitude modulated by a subcarrier signal, said subcarrier signal being devoid of intentional amplitude-modulation components below a predetermined frequency but being intentionally frequency-modulated at a frequency below said predetermined frequency, means for providing the principal automatic gain control function for said receiver and for suppressing unwanted amplitude-modulation components below said predetermined frequency appearing on said carrier signal and retrieving the frequency modulation, said means comprising:

first means for detecting said carrier signal and separating said subcarrier signal therefrom;

means for detecting the separated subcarrier signal and separating amplitude-modulation components therefrom;

means for passing only those amplitude-modulation components separated from said subcarrier signal which are below said predetermined frequency and for shifting the phase of the passed amplitude-modulation components of said subcarrier signal sufficiently to render them in phase opposition with said unwanted amplitude-modulation components appearing on said carrier signal;

control means for varying the amplitude of said carrier signal as a function of the amplitude of the phase-shifted amplitude-modulation components of said sub-carrier signal;

second means independent of said first means for separating said subcarrier signal from other detected amplitude-modulation components of said carrier signal; and means coupled with the output of said second means for detecting frequency-modulation components of said subcarrier signal.

2. The combination according to claim 1 wherein said control means comprises:

an amplifier for amplifying said carrier signal; and automatic gain control means for varying the gain of said amplifier in proportion to the amplitude of said phase-shifted amplitude-modulation components of said subcarrier signal.

3. The combination according to claim 1 wherein said second means includes a band pass filter having a pass band of a width sufficient to pass said frequency modulated subcarrier by limited to an extent to suppress signal frequencies substantially outside of the modulation swing of said subcarrier, and wherein said first means includes a band pass filter having a pass band of substantially greater width than the pass band of the filter of said second means and sufficient to impart stability to the automatic gain control.

4. In a communications system wherein a transmitted signal comprises a carrier which is amplitude-modulated by at least one subcarrier signal, said subcarrier signal having no intentional amplitude-modulation components below a predetermined frequency, and wherein said transmitted signal is subject to unwanted amplitude-modulation below said predetermined frequency, a receiver arranged to receive the transmitted signal and suppress said unwanted amplitude-modulation appearing on the received signal, said receiver including:
  first and second means for individually separating said subcarrier signal from said carrier signal;
  means for detecting the subcarrier signal separated by said first means to separate amplitude modulation components therefrom;
  means for demodulating the subcarrier signal separated by said second means;
  means coupled with said detecting means for passing only those separated amplitude-modulation components having frequencies below said predetermined frequency and for phase-shifting the passed amplitude-modulation components into phase opposition with the unwanted amplitude-modulation appearing on said received signal; and
  control means for varying the amplitude of said received signal as a function of the amplitude of said phase-shifted amplitude-modulation components.

5. The combination according to claim 4, wherein said control means includes:
  amplifier means for amplifying said received signal; and
  automatic gain control means serving as the principal automatic gain control of said receiver for varying the gain of said amplifier means in proportion to the amplitude of said phase-shifted amplitude-modulation components.

6. The combination according to claim 5 wherein said system is a VOR system, said subcarrier being frequency modulated by a reference signal at a specified frequency, said transmitted signal being transmitted from a reference station in a pattern which rotates at said specified frequency about said reference station, said means for demodulating including means for separating said reference signal from said subcarrier, said receiver additionally including:
  means for separating from said received signal a predetermined amplitude-modulation component thereof at said specified frequency and having a phase which varies relative to the phase of said reference signal as a function of the bearing of said receiver relative to said reference station; and
  means for indicating the phase difference between said reference signal and said predetermined amplitude component.

7. The combination according to claim 6 wherein said specified frequency is lower than said predetermined frequency.

8. The method of suppressing unwanted amplitude-modulation below a predetermined frequency appearing on a communications signal, which signal includes a carrier which is amplitude-modulated by a subcarrier, said subcarrier being devoid of intentional amplitude-modulation below said predetermined frequency, said method comprising the steps of:
  separating said subcarrier from said carrier;
  detecting amplitude-modulation components of said subcarrier;
  passing only those detected amplitude-modulation components of said subcarrier which have frequencies below said predetermined frequency;
  phase-shifting the amplitude-modulation components thus passed;
  varying the amplitude of said carrier in proportion to the amplitude of the phase-shifted amplitude-modulation components; and
  significantly reducing the amplitude of said carrier independently of said phase-shifted amplitude-modulated components whenever the amplitude of said carrier exceeds a predetermined level.

9. The method according to claim 8 wherein the step of varying includes the step of amplifying said communications signal with a gain that varies in direct proportion to the amplitude of said phase-shifted amplitude-modulation components.

10. In a navigation system for an aircraft wherein a navigation signal is transmitted from a reference station and comprises a carrier which is amplitude modulated by a subcarrier, the subcarrier being frequency-modulated by a specified low frequency reference signal but having no intentional amplitude-modulation components below a predetermined frequency, said navigation signal being transmitted in space in a pattern which rotates about said reference station at said specified frequency, the method of providing the principal automatic gain control at an aircraft receiving said signal and simultaneously suppressing unwanted amplitude-modulation below said predetermined frequency from said navigation signal when received by said aircraft, said method comprising the steps of:
  separating said subcarrier from said navigation signal;
  demodulating the separated subcarrier to detect all amplitude-modulation components thereof;
  passing only those amplitude-modulation components of said subcarrier which have frequencies below said predetermined frequency;
  phase-shifting the amplitude-modulation components thus passed into phase opposition with said unwanted amplitude-modulation appearing on said navigation signal;
  varying the amplitude of said navigation signal as a function of said phase-shifted amplitude-modulation components; and
  significantly reducing the amplitude of said navigation signal received by said aircraft independently of said phase-shifted amplitude-modulation components whenever the amplitude of said navigation signal exceeds a predetermined level.

11. The method according to claim 10 wherein the step of varying comprises amplifying said navigation signal by an amplification factor which is directly proportional to the amplitude of said phase-shifted amplitude-modulation components.

12. The method according to claim 11 wherein said specified low frequency is lower than said predetermined frequency.

13. The method according to claim 11 further comprising the steps of:
  FM detecting said subcarrier to separate therefrom said reference signal;
  demodulating said navigation signal to separate there-from a further signal at said specified low frequency and having a phase which varies from that of said reference signal as a function of the bearing of said aircraft relative to said reference station; and
  providing an indication of the bearing of said aircraft as a function of the difference in phase between said reference signal and said further signal.

14. In a receiver wherein a received signal comprises a carrier signal which is intentionally amplitude modulated by a subcarrier signal, said subcarrier signal being devoid of intentional amplitude-modulation components below a predetermined frequency, means for providing the principal and supplemental automatic gain control functions for said receiver and for suppressing unwanted amplitude-modulation components below said predetermined frequency appearing on said carrier signal, said means comprising:

first means for detecting said carrier signal and separating said subcarrier signal therefrom;

means for detecting the separated subcarrier signal and separating amplitude-modulation components therefrom;

means for passing only those amplitude-modulation components separated from said subcarrier signal which are below said predetermined frequency and for shifting the phase of the passed amplitude-modulation components of said subcarrier signal sufficiently to render them in phase opposition with said unwanted amplitude-modulation components appearing on said carrier signal;

control means for varying the amplitude of said carrier signal as a function of the amplitude of the phase-sifted amplitude-modulation components of said subcarrier signal;

threshold detector means for providing an output signal only when the amplitude of said carrier signal and its amplitude-modulation components exceed a predetermined amplitude; and means for significantly reducing the amplitude of said carrier signal independently of said phase-shifted amplitude-modulation components of said subcarrier signal whenever an output signal is provided by said threshold detector means.

15. In a receiver where a received signal has a carrier which is intentionally amplitude modulated by a subcarrier, said subcarrier being devoid of intentional amplitude modulation below a predetermined frequency but being intentionally frequency modulated at a frequency below said predetermined frequency, apparatus for automatically controlling the gain of said receiver and the suppressing unwanted amplitude-modulation components of said received signal below said predetermined frequency, said apparatus comprising:

means responsive to said received signal for demodulating the latter to detect the amplitude-modulation components on said carrier;

a band pass filter responsive to the output of said demodulating means for separating said subcarrier from other detected amplitude-modulation components of said carrier;

means responsive to said subcarrier delivered by said filter for separating therefrom those amplitude-modulation components of the subcarrier below said predetermined frequency; and control means in said receiver coupled with the output of said separating means for varying the amplitude of said received signal as an inverse function of the amplitude of the amplitude-modulation components of said subcarrier below said predetermined frequency, said filter having a pass band of substantially greater width than the modulation swing of said frequency-modulated subcarrier and sufficient to impart stability to the gain control function executed by said control means, said filter, separating means, and control means constituting the primary automatic gain control for said receiver.

* * * * *